United States Patent
Baumgart et al.

(10) Patent No.: US 8,426,500 B2
(45) Date of Patent: Apr. 23, 2013

(54) CATHODIC ELECTRODEPOSITION PAINT CONTAINING A VINYLPYRROLIDONE COPOLYMER

(75) Inventors: Hubert Baumgart, Münster (DE); Udo Höffmann, Drensteinfurt (DE); Iris Ross-Lippke, Senden (DE); Stephan Heffels, Münster (DE)

(73) Assignee: BASF Coatings GmbH, Munster (DE)

( * ) Notice: Subject to any disclaimer, the term of this patent is extended or adjusted under 35 U.S.C. 154(b) by 291 days.

(21) Appl. No.: 12/991,597

(22) PCT Filed: May 6, 2009

(86) PCT No.: PCT/EP2009/003239
§ 371 (c)(1),
(2), (4) Date: Jan. 10, 2011

(87) PCT Pub. No.: WO2009/135663
PCT Pub. Date: Nov. 12, 2009

(65) Prior Publication Data
US 2011/0100824 A1  May 5, 2011

(30) Foreign Application Priority Data
May 7, 2008 (DE) .......... 10 2008 022 464

(51) Int. Cl.
*C09D 5/44* (2006.01)
*C25D 13/12* (2006.01)
*B32B 15/08* (2006.01)

(52) U.S. Cl.
USPC ........... 523/415; 204/489; 204/506; 204/510; 428/418

(58) Field of Classification Search ................. 523/415; 204/489, 506, 510; 428/418
See application file for complete search history.

(56) References Cited

U.S. PATENT DOCUMENTS

| | | |
|---|---|---|
| 3,862,915 A | 1/1975 | Fried et al. |
| 4,738,994 A | 4/1988 | Weiss |
| 5,089,101 A | 2/1992 | Hayashi et al. |
| 5,236,564 A | 8/1993 | Berg et al. |
| 6,475,366 B1 | 11/2002 | Nishiguchi et al. |

FOREIGN PATENT DOCUMENTS

| | | |
|---|---|---|
| DE | 2218935 A | 10/1973 |
| EP | 0358221 A2 | 3/1990 |
| EP | 0505445 B1 | 11/1994 |
| EP | 0961797 B1 | 12/1999 |
| EP | 1171530 B1 | 1/2002 |
| WO | WO98/33835 A1 | 8/1998 |
| WO | WO00/64990 A1 | 11/2000 |

OTHER PUBLICATIONS

International Search Report for International application No. PCT/EP2009/003239 dated Oct. 7, 2009.
Written Opinion for International application No. PCT/EP2009/003239.
International Preliminary Report on Patentability for International application No. PCT/EP2009/03239 dated Dec. 18, 2010.

*Primary Examiner* — Kishor Mayekar
(74) *Attorney, Agent, or Firm* — Cantor Colburn LLP

(57) ABSTRACT

An aqueous coating composition comprising (A) at least one water-dispersible organic binder containing cationic groups and (B) 0.05%-10% by weight, based on the solids content of the aqueous coating composition, of a water-thinnable vinylpyrrolidone copolymer, where the vinylpyrrolidone copolymer (B) contains vinylpyrrolidone monomer units and vinyl acetate monomer units in a molar ratio of 0.3:0.7 to 0.7:0.3, preferably of 0.4:0.6 to 0.6:0.4 and possesses a weight-average molecular weight of less than 200 000 g/mol.

16 Claims, 1 Drawing Sheet

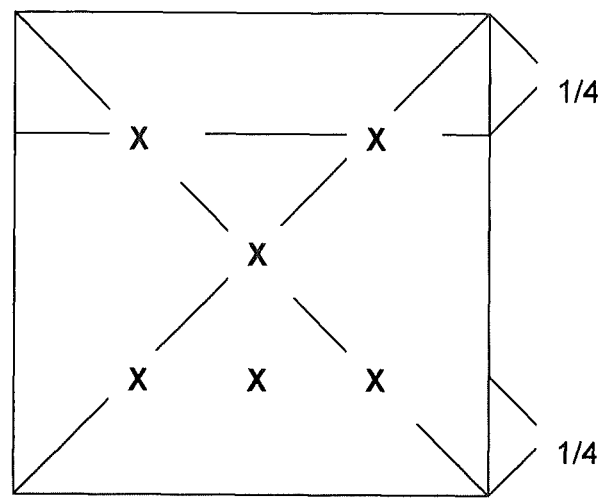

CATHODIC ELECTRODEPOSITION PAINT CONTAINING A VINYLPYRROLIDONE COPOLYMER

CROSS REFERENCE TO RELATED APPLICATIONS

This application is a National Phase Application of Patent Application PCT/EP2009/003239 filed on 06 May 2009, which claims priority to DE 10 2008 022 464.2, filed 07 May 2008, both of which are hereby incorporated by reference in their entirety.

FIELD OF THE INVENTION

The present invention relates to an aqueous coating composition comprising at least one water-dispersible organic binder containing cationic groups and 0.05%-10% by weight, based on the solids content of the aqueous coating composition, of a water-thinnable vinylpyrrolidone copolymer. The present invention further relates to a process for preparing this coating composition and also to its use.

BACKGROUND OF THE INVENTION

Coating compositions of the type specified are known, for example, from EP 1171530 A1. They are used in general as cathodically depositable electrodeposition primers. EP 1171530 A1 describes electrodeposition primer compositions which yield coatings having very few disruptive craters at the same time as good adhesion of subsequent paint films. The reduction in the number of craters is achieved through the addition of homopolymers or copolymers based on polyvinylpyrrolidone, where a very wide variety of monomers can be used as comonomers. A particularly good anticrater effect is attained by polymers having a molecular weight>200 000.

EP 0358221 A2 describes electrodeposition coating solution compositions that yield coatings having very few disruptive craters in tandem with unaltered good impact strengths, adhesion of subsequent paint films, and surface qualities. For this purpose polymer microparticles are added as anticrater agents to the coating composition. The polymer microparticles have a size of 0.01 to 10 μm and can be prepared in the form of homopolymers or copolymers. The size distribution of the microparticles has a large influence on the anticrater effect. A particularly good anticrater effect is achieved in the case of bimodal or multimodal distribution of the particle sizes, i.e., when two or more microparticle populations having different particle sizes are combined.

SUMMARY OF THE INVENTION

U.S. Pat. No. 5,089,101 describes a cationic electrodeposition coating composition which comprises a neutralization product or quaternary ammonium salt of a comb copolymer of a) an ethylenically unsaturated monomer having a terminal hydrocarbon chain of at least 8 carbon atoms, b) at least one further-specified cationic (meth)acrylic monomer, c) a 1-vinyl-2-pyrrolidone, and d) a further alpha,beta-unsaturated monomer. This cationic electrodeposition coating composition yields coatings having sufficient weathering resistance and good corrosion control.

The cathodically depositable electrodeposition primers that are currently in use typically meet exacting requirements in terms of corrosion control, edge protection, surface quality, and other properties, such as sandability. Nowadays, however, it is additionally required that a cathodic dip coating have very few runs (runs and tears from gaps and cavities). In the case of the cathodic electrodeposition coating of vehicle bodies, for example, solution material may penetrate into niches and cavities, such as into the spaces between metal panel seams, for example. If this material is not completely removed on rinsing, it emerges from the seam when the paint is baked, and leads to plastic run tracks (run marks) in the electrodeposition primer film. Severe run marks have to be removed in practice by sanding. This additional sanding operation gives rise to increased cost and increased time taken in the production operation. Despite a wide variety of technical measures, such as repeated dipping of the painted substrate in deionized water, mechanical agitation of the article being painted and/or primary drying of the article being painted, or parts thereof, in a stream of air, success in reliably avoiding this defect has not been achieved to date.

It was an object of the invention, therefore, to provide a coating composition which is suitable for cathodic electrodeposition and exhibits a reduced tendency to form runs (runs and tears from gaps and cavities), thereby allowing a subsequent sanding operation for removing run marks to be dispensed with. By this means it is possible to make production of corresponding painted substrates more time- and cost-effective.

This object is achieved surprisingly through the provision of an aqueous coating composition comprising (A) at least one water-dispersible organic binder containing cationic groups and (B) 0.05%-10% by weight, based on the solids content of the aqueous coating composition, of a water-thinnable vinylpyrrolidone copolymer, wherein the vinylpyrrolidone copolymer (B) contains vinylpyrrolidone monomer units and vinyl acetate monomer units in a molar ratio of 0.3:0.7 to 0.7:0.3 and possesses a weight-average molecular weight of less than 200 000 g/mol.

DETAILED DESCRIPTION OF AN EMBODIMENT OF THE INVENTION

The coating composition of the invention preferably has a solids content of 12%-25%, more preferably of 15%-22%, and, with more particular preference, of 18%-20%, by weight, based in each case on the total coating composition of the invention. The solids content is determined as the nonvolatile mass fraction after drying at 180° C. for 30 minutes.

The coating composition of the invention preferably has a pH of 4.8-6.5, more preferably of 5.2-6.2 and, with more particular preference, of 5.5-6.0. The pH can be determined using the methods that are known and used typically for that purpose, such as by potentiometry, for example.

The coating composition of the invention preferably has an electrical conductivity of 0.8-2.5 mS/cm, more preferably of 1.1-2.3 mS/cm, and, with more particular preference, of 1.3-1.9 mS/cm. The conductivity can be determined using the methods that are known and used typically for this purpose.

The coating composition of the invention is preferably a cathodically depositable electrodeposition primer. Cathodically depositable electrodeposition primers are suitable for use in cathodic electrodeposition (cathodic electrocoat). Cathodic electrocoat is a painting process that is frequently employed in particular for priming, involving the application of binders which carry cationic groups, in solution or dispersion in water, to electrically conducting bodies by means of direct current. For this purpose the substrate to be coated is connected as the cathode and is immersed in the cathodically depositable electrodeposition primer. When a direct current is applied between the substrate connected as the cathode and an anode which is likewise sited within the electrodeposition primer, the charged paint micelles or dispersion particles, within a diffusion-controlled boundary layer, pass to the oppositely charged electrode, where they are precipitated through a change in pH resulting from the electrolytic decomposition of the water. If the surface charge of the paint micelles or dispersion particles is positive, then deposition takes place at the cathode, i.e., on the substrate connected as the cathode. The paint film deposited has a high solids content and is typically crosslinked by baking after the substrate has been removed from the dip tank and after any cleaning steps.

The coating composition of the invention comprises preferably 60%-95%, more preferably 75%-90%, and, with more particular preference, 80%-85%, by weight, based on the solids content of the coating composition, of at least one water-dispersible organic binder (A) containing cationic groups. In principle there are no restrictions on the selection of the binder or binders (A), and so in principle any water-dispersible organic binder containing cationic groups is suitable.

Preferably at least one binder (A) contains primary, secondary, tertiary or quaternary amino and/or ammonium groups.

Amine-modified epoxy resins are used with particular preference as binders (A).

Examples of suitable amine-modified epoxy resins are the adducts of modified or unmodified polyepoxides with primary or secondary amines (described for example in EP 1171530 A1, page 8, line 10 to page 9, line 2, and in U.S. Pat. No. 5,236,564, page 1, line 44 to page 3, line 49).

Examples of suitable polyepoxides are polyglycidyl ethers, which are obtainable from polyphenols and epihalohydrin, more particularly epichlorohydrin. Preferred polyphenols are, more particularly, bisphenol A and bisphenol F. Further suitable polyphenols are, for example, 4,4"-dihydroxybenzophenone, 1,1-bis(4-hydroxyphenyl)ethane, 1,1-bis(4-hydroxyphenyl)isobutane, 2,2'-bis-(4-hydroxy-tert-butylphenyl)propane, bis(2-hydroxynaphthyl)methane, 1,5-dihydroxynaphthalene, and phenolic novolak resins. Further suitable polyepoxides are polyglycidyl ethers of polyhydric alcohols, such as ethylene glycol, diethylene glycol, triethylene glycol, 1,2-propylene glycol, 1,4-propylene glycol, 1,5-pentanediol, 1,2,6-hexanetriol, glycerol, and 2,2-bis(4-hydroxycyclohexyl)propane. It is also possible to use polyglycidyl esters of polycarboxylic acids, such as oxalic acid, succinic acid, glutaric acid, terephthalic acid, hexahydrophthalic acid, isophthalic acid, 2,6-napththalenedicarboxylic acid. Suitability is possessed further by hydantoin epoxides, epoxidized polybutadiene, and polyepoxide compounds that are obtained by epoxidizing an olefinically unsaturated aliphatic compound.

By modified polyepoxides are meant polyepoxides in which some of the reactive groups have been reacted with a modifying compound. Examples of modifying compounds include the following:

a) compounds containing carboxyl groups, such as saturated or unsaturated monocarboxylic acids (e.g. benzoic acid, 2-ethylhexanoic acid, Versatic acid), aliphatic, cycloaliphatic and/or aromatic dicarboxylic acids of various chain lengths (e.g., adipic acid, sebacic acid, isophthalic acid or dimeric fatty acids), hydroxyalkylcarboxylic acids (e.g., lactic acid, dimethylolpropionic acid), and carboxyl-containing polyesters, or b) compounds containing amino groups, such as diethylamine or ethylhexylamine or diamines with secondary amino groups, e.g., N,N'-dialkylalkylenediamines, such as dimethylethylenediamine, N,N"-dialkylpolyoxyalkyleneamine, such as N,N"-dimethylpolyoxypropylenediamine, cyanoalkylated alkylenediamines, such as bis-N,N"-cyanoethylethylenediamine, cyanoalkylated polyoxyalkyleneamines, such as bis-N,N'-cyanoethylpolyoxypropylenediamine, polyamino amides, such as Versamides, more particularly amino-terminated reaction products of diamines (e.g. hexamethylenediamine), polycarboxylic acids, more particularly dimer fatty acids and monocarboxylic acids, more particularly fatty acids, or the reaction product of one mole of diaminohexane with two moles of monoglycidyl ether or monoglycidyl ester, especially glycidyl esters of alpha-branched fatty acids such as of Versatic acid, or c) compounds containing hydroxyl groups, such as neopentyl glycol, bisethoxylated neopentyl glycol, neopentyl glycol hydroxypivalate, dimethylhydantoin-N,N"-diethanol, hexane-1,6-diol, hexane-2,5-diol, 1,4-bis(hydroxymethyl)cyclohexane, 1,1-isopropylidenebis(p-phenoxy)-2-propanol, trimethylolpropane, pentaerythritol, or amino alcohols, such as triethanolamine, methyldiethanolamine or hydroxyl-containing alkylketimines, such as aminomethylpropane-1,3-diol methyl isobutyl ketimine or tris(hydroxymethyl)aminomethane cyclohexanone ketimine, and also polyglycol ethers, polyester polyols, polyether polyols, polycaprolactone polyols, polycaprolactam polyols of varying degrees of functionality and molecular weights, or d) saturated or unsaturated fatty acid methyl esters which are transesterified in the presence of sodium methoxide with hydroxyl groups of the epoxy resins.

Primary and/or secondary amines suitable for formation of adducts with polyepoxides are, for example, mono- and dialkylamines, such as methylamine, ethylamine, propylamine, butylamine, dimethylamine, diethylamine, dipropylamine, methylbutylamine, and the like. Likewise suitable are alkanolamines, such as methylethanolamine, diethanolamine, and the like. Suitability is further possessed by dialkylaminoalkylamines, such as dimethylaminoethylamine, diethylamino-propylamine, dimethylaminopropylamine, and the like. In the majority of cases use is made of low molecular weight amines, although it is also possible to employ monoamines of higher molecular weight. The amines may also additionally contain other groups, although these groups should not disrupt the reaction of the amine with the epoxide group and should also not lead to any gelling of the reaction mixture. It is preferred to use secondary amines to form adducts with polyepoxides.

The charges that are needed for electrical deposition can be generated by protonization with water-soluble acids (e.g., boric acid, formic acid, lactic acid, acetic acid).

A further possibility for the introduction of cationic groups lies in the reaction of epoxide groups with amine salts.

The amine-modified epoxy resins can be used either in the form of externally crosslinking synthetic resins or in the form of self-crosslinking synthetic resins. Self-crosslinking synthetic resins can be obtained, for example, by chemically modifying the amine-modified epoxy resins, by for example reacting the amine-modified epoxy resin with a part-blocked polyisocyanate that possesses on average one free isocyanate group per molecule and whose blocked isocyanate groups are deblocked only at elevated temperatures.

It is preferred to use externally crosslinking amine-modified epoxy resins in combination with a suitable crosslinking agent. Examples of suitable crosslinkers are phenolic resins, polyfunctional Mannich bases, melamine resins, benzoguanamine resins and blocked polyisocyanates. Preferred crosslinkers used are blocked polyisocyanates.

As blocked polyisocyanates it is possible to use any desired polyisocyanates in which the isocyanate groups have been reacted with a compound so that the blocked polyisocyanate formed is resistant to hydroxyl groups and amine groups at room temperature, but at elevated temperatures, generally in the range from about 90° C. to about 300° C., undergoes reaction. In the preparation of the blocked polyisocyanates it is possible to use any organic polyisocyanates that are suitable for crosslinking. Preference is given to the isocyanates which contain about 3 to 36, more particularly about 8 to about 15, carbon atoms. Examples of suitable diisocyanates are hexamethylene diisocyanate, 2,4-tolylene diisocyanate, 2,6-tolylene diisocyanate, and 1-isocyanatomethyl-5-isocyanato-1,3,3,-trimethylcyclohexane. Polyisocyanates of higher isocyanate functionality can also be used. Examples thereof are trimerized hexamethylene diisocyanate and trimerized isophorone diisocyanate. Furthermore, mixtures of polyisocyanates can be used as well. The organic polyisocyanates contemplated as crosslinking agents in the context of the invention may also be prepolymers, deriving for example from a polyol, including a polyether polyol or a polyester polyol.

For the blocking of the polyisocyanates it is possible to use any desired suitable aliphatic, cycloaliphatic or aromatic alkyl monoalcohols. Examples thereof are aliphatic alcohols, such as methyl, ethyl, chloroethyl, propyl, butyl, amyl, hexyl, heptyl, octyl, nonyl, 3,5,5-trimethylhexyl, decyl, and lauryl alcohol; cycloaliphatic alcohols, such as cyclopentanol and cyclohexanol; aromatic alkyl alcohols, such as phenyl carbinol and methyl phenyl carbinol.

Other suitable blocking agents are hydroxylamines, such as ethanolamine, oximes, such as methyl ethyl ketone oxime, acetone oxime, and cyclohexanone oxime, or amines, such as dibutylamine and diisopropylamine. The stated polyisocyanates and blocking agents can in suitable proportions also be used to prepare the abovementioned part-blocked polyisocyanates.

Very particular preference is given to using at least one binder (A) which is present in an aqueous binder dispersion which is obtainable by
i) reacting 1) a precursor preparable with addition of phosphines and/or phosphine salts as catalyst from a) a diepoxide compound or a mixture of diepoxide compounds and b) monophenol, diphenol or a mixture of monophenols and diphenols,
   2) with at least one organic amine or a mixture of organic amines at addition temperatures reduced to 60 to 130° C., to form an epoxide-amine adduct,
ii) subsequently or simultaneously reacting the secondary hydroxyl groups formed in the reaction of component a) and b) with epoxide groups of the epoxide-amine adduct prepared in step i), at a temperature of 110 to 150° C.,
iii) adding a crosslinking agent or a mixture of different crosslinking agents at a temperature of <150° C.,
iv) carrying out neutralization, and
v) dispersing the mixture obtained in stages i) to iv) in water.
This binder dispersion is described in EP 0691797 B1.

The coating composition of the invention comprises 0.05%-10%, preferably 0.1%-5%, more preferably 0.2%-1%, by weight, based on the solids content of the aqueous coating composition, of a water-thinnable vinylpyrrolidone copolymer (B).

The vinylpyrrolidone copolymer (B) possesses a weight-average molecular weight of less than 200 000 g/mol, preferably of 30 000-170 000 g/mol, more preferably of 100 000-150 000 g/mol, the weight-average molecular weight being determined by gel permeation chromatography using styrene as standard (in accordance for example with DIN 55672-1 (02.1995) with tetrahydrofuran as eluent).

The vinylpyrrolidone copolymer (B) contains vinylpyrrolidone monomer units and vinylacetate monomer units in a molar ratio of 0.3:0.7 to 0.7:0.3, preferably of 0.4:0.6 to 0.6:0.4.

Besides vinylpyrrolidone monomer units and vinylacetate monomer units the vinylpyrrolidone copolymer (B) may also contain units of at least one other monoethylenically unsaturated monomer. Preferably, based in each case on the total weight of the vinylpyrrolidone copolymer (B), the vinylpyrrolidone copolymer (B) contains not more than 20% by weight of further monomers, more preferably not more than 10% by weight of further monomers, and very preferably no further monomers besides vinylpyrrolidone monomer units and vinyl acetate monomer units.

The vinylpyrrolidone copolymer (B) can be prepared, for example, by free-radical polymerization, which can be set in operation thermally, photochemically (by means of UV light, for example) or chemically following addition of corresponding free-radical initiators, such as of peroxides, for example. Suitable starting materials are vinylpyrrolidone, vinyl acetate, and, if desired, further (vinyl)monomers.

The aqueous coating composition of the invention may comprise further additives such as, for example, crosslinkers, pigments, plasticizers, fillers, and wetting agents. More particularly the coating composition of the invention may comprise one or more crosslinkers and/or one or more pigments.

Preferably the coating composition of the invention comprises 18% to 28%, more preferably 22%-27%, and, with more particular preference, 24%-26%, by weight, based on the solids content of the coating composition, of at least one crosslinker. With particular preference the coating composition of the invention contains 18% to 28%, more preferably 22%-27%, and, with more particular preference, 24%-26%, by weight, based on the solid contents of the coating composition, of at least one blocked (poly)isocyanate crosslinker.

The coating composition of the invention preferably comprises 5% to 40%, more preferably 10%-25%, and, with more particular preference, 15-20%, by weight, based on the solids content of the coating composition, of at least one pigment.

Examples of suitable pigments are white pigments such as titanium dioxide, aluminum silicate, silicon dioxide, zinc oxide, zinc sulfide, barium sulfate, calcium carbonate, magnesium carbonate, and magnesium silicate, or black pigments, such as carbon black, or else, for example, colored pigments. The colored pigments include, for example, inorganic chromatic pigments, such as iron oxides or chromium oxides, and organic chromatic pigments, such as azo pigments, triphenylmethane pigments, indigoid pigments, metal complex pigments, isoindolinones, anthraquinones, perylene and perinone pigments, dioxazine pigments, quinophthalones, diketopyrrolopyrrole or pyrazoloquinazolone pigments, for example.

The present invention further provides a process for preparing the coating composition of the invention. The coating composition of the invention can be prepared by i) dispersing at least one water-dispersible organic binder (A) containing cationic groups in an aqueous solution to give an aqueous binder dispersion, ii) mixing the aqueous binder dispersion with 0.05% to 10% by weight, based on the solids content of the aqueous coating composition, of a water-thinnable vinylpyrrolidone copolymer (B) having a weight-average molecular weight of less than 200 000 g/mol comprising vinylpyrrolidone monomer units and vinyl acetate monomer units in a molar ratio of 0.3:0.7 to 0.7:0.3, and iii) if desired, introducing further additives.

As aqueous solution suitability is possessed, for example, by water, but also aqueous solutions of suitable acids or salts.

Pigments are incorporated preferably in the form of a pigment paste into the aqueous binder dispersion with stirring. The production of pigment pastes is common knowledge and is described for example in EP 0505445 B1.

The present invention additionally provides for the use of the coating composition of the invention. The coating composition of the invention can be used to coat electrically conductive substrates, more particularly by means of cathodic electrodeposition. Preferably the coating composition of the invention is used to coat metallic substrates, such as substrates of steel, aluminum, copper, alloys thereof or the like, more preferably to coat phosphatized metallic substrates, more preferably still to coat phosphatized steel, and with very particular preference to coat motor vehicle bodies or parts thereof.

By cathodic electrodeposition is meant a method of coating electrically conductive substrates wherein
1) the substrate is immersed into an aqueous electrodeposition primer which comprises at least one cathodically depositable binder,
2) the substrate is connected as the cathode,
3) using direct current, a film is deposited on the substrate,
4) the substrate is removed from the electrodeposition primer, and
5) the paint film deposited is baked.

Cathodic electrodeposition is employed more particularly for the priming of workpieces.

The temperature of the electrodeposition solution ought typically to be between 15 to 40° C., preferably between 25 and 35° C. The voltage applied may vary within a wide range and can be, for example, between 50 and 500 volts. Typically however, operation takes place with voltages between 250 and 400 volts. Following deposition, the coated article is rinsed and is ready for baking. The deposited paint films are baked generally at temperatures of 130 to 220° C. over a time of 8 to 60 minutes, preferably at 150 to 180° C. over a time of 12 to 30 minutes.

Examples of suitable metallic substrates are those of steel, aluminum, copper, alloys of different metals or the like. It is preferred to use substrates of steel. Particular preference is given to using substrates comprising phosphatized metallic substrates, more particularly substrates of phosphatized steel. By phosphatized metallic substrates are meant metallic substrates which have been provided with phosphate-containing inorganic conversion coats by means of corresponding chemical pretreatment. As substrates of this kind, particular preference is given to motor vehicle bodies or parts thereof.

Accordingly the present invention further provides a substrate coated with the coating composition of the invention, more particularly a metallic substrate, such as a substrate of steel, aluminum, copper, alloys of different metals or the like, for example, preferably a substrate of phosphatized metal, more particularly of phosphatized steel. Very particular preference is given to motor vehicle bodies or parts thereof coated with the coating composition of the invention.

The invention is illustrated in the examples which follow. All parts and percentage data are by weight unless expressly stated otherwise.

WORKING EXAMPLE

Preparation Example 1

Crosslinker

The crosslinker used is that from EP 0961797 B1 (page 6, lines 43-52). A reactor equipped with a stirrer, reflux condenser, internal thermometer, and inert gas inlet is charged with 1084 g of isomers and higher polyfunctional oligomers based on 4,4"-diphenylmethane diisocyanate and having an NCO equivalent weight of 135 (Basonat®A270, BASF; NCO functionality about 2.7; 2,2'- and 2,4'-diphenylmethane diisocyanate content less than 5%) under a nitrogen atmosphere. 2 g of dibutyltin laurate are added and 1314 g of butyl diglycol are added dropwise at a rate such that the product temperature remains below 70° C. Where appropriate, cooling must be carried out. After the end of the addition, the temperature is held at 70° C. for a further 120 minutes. In the course of a subsequent check, NCO groups are no longer detectable. The batch is cooled to 65° C.

The solids content is >97% (1 h at 130° C.).

Preparation Example 2

Binder Dispersion

The binder dispersion used is dispersion A from EP 0961797 B1 (page 7 lines 4-30). A laboratory reactor heated by heat transfer oil and equipped with stirrer, reflux condenser, thermometer, and inert gas inlet tube is charged with 1128 parts of a commercially customary epoxy resin based on bisphenol A and having an epoxide equivalent weight (EEW) of 188; 262 parts of dodecylphenol, 31.4 parts of xylene, and 228 parts of bisphenol A and this initial charge is heated to 127° C. under nitrogen. With stirring, 1.6 g of triphenylphosphine are added, whereupon there is an exothermic reaction and the temperature climbs to 160° C. The batch is cooled to 130° C. again and then the epoxide content is checked. The EEW of 532 indicates that >98% of the phenolic OH groups have reacted. At this point 297.5 parts of Pluriol P 900 (polypropylene glycol MW 900, BASF) are added with simultaneous cooling. 5 minutes later, at 120° C. and with further cooling, 105 parts of diethanolamine are added. When, after a brief exotherm ($T_{max}$ 127° C.), the temperature has dropped to 110° C. (30 minutes), 51 parts of N,N-dimethylaminopropylamine are added. After a brief exotherm ($T_{max}$ 140° C.) the batch is reacted further at 130° C. for 2 hours until the viscosity remains constant (1.8 dPas, plate/cone viscometer at 23° C., 40% strength in Solvenon PM (BASF)). At this point, with simultaneous cooling, 58.5 parts of butyl glycol and 887.8 parts of the crosslinker (preparation example 1) are added and the product is discharged at 105° C.

2100 parts of the still-hot mixture are dispersed immediately in a pre-prepared mixture of 1945 parts of fully demineralized water (DM water) and 33.1 parts of glacial acetic acid with intensive stirring. After brief homogenization, this mixture is diluted with a further 1404 parts of DM water and filtered on a K900 plate filter (Seitz). The characteristics of the dispersion are as follows:
Solids (1 h at 130° C.): 35.7%
MEQ base=0.657 meq/g resin solids
MEQ acid=0.283 meq/g resin solids
pH=5.4
Average particle size=1250 Å (light scattering method)
Sedimentation stability=no sediment after 3 months' storage at room temperature
Viscosity=14 sec. (DIN4 cup at 23° C.)

Preparation Example 3

Grinding Resin

The grinding resin used is resin A from EP 0961797 (page 9, lines 17-21). A reactor equipped with stirrer mechanism, internal thermometer, nitrogen inlet, and water separator with reflux condenser is charged with 30.29 parts of an epoxy resin based on bisphenol A and having an epoxide equivalent weight (EEW) of 188, 9.18 parts of bisphenol A, 7.04 parts of dodecylphenol, and 2.37 parts of butyl glycol. This initial charge is heated to 110° C., 1.85 parts of xylene are added, and this xylene is distilled off again under gentle vacuum together with possible traces of water. At this point 0.07 part of triphenylphosphine is added and the mixture is heated to 130° C. After exothermic heat liberation to 150° C., reaction is continued at 130° C. for a further hour. The EEW of the reaction mixture at this point is 860. It is cooled, during which 9.91 parts of butyl glycol and 17.88 parts of a polypropylene glycol diglycidyl ether with an EEW of 333 (DER 732, Dow Chemicals) are added. At 90° C. 4.23 parts of 2-2"-aminoethoxyethanol ($H_2N-CH_2-CH_2-O-CH_2-CH_2-OH$) and, 10 minutes later, 1.37 parts of N,N-dimethylaminopropylamine are added. After a brief exotherm the reaction mixture is held at 90° C. for a further 2 hours until the viscosity remains constant, after which it is diluted with 17.66 parts of butyl glycol. The resin has a solids content of 69.8% (measured for 1 h at 130° C.) and a viscosity of 5.5 dPas (measured on 40% strength resin solution diluted with propylene glycol monomethyl ether (Solvenon PM, BASF) on a plate/cone viscometer at 23° C.). For greater ease of handling the resin is additionally neutralized and diluted with 2.82 parts of glacial acetic acid and 13.84 parts of DM water. This lowers the original solids content to 60%.

Preparation Example 4

Aqueous Pigment Paste

The aqueous pigment paste is prepared in analogy to the method described in EP 0505445 B1 (page 10 lines 35-41) from 25 parts of the grinding resin from preparation example 3, 6 parts of aluminum silicate, 0.6 part of carbon black, 38.1 parts of titanium dioxide, 2.7 parts of dibutyltin oxide, and 27.1 parts of deionized water. For this purpose first of all deionized water and the grinding resin are premixed. Then the remaining ingredients are added and the mixture is mixed for 30 minutes in a high-speed dissolver-stirrer mechanism. The mixture is subsequently dispersed in a small-scale laboratory mill for 1 to 1.5 hours to a Hegmann fineness of less than 12.

Example

Aqueous Coating Composition

To produce a conventional (I) and an inventive (II) coating composition, the binder dispersion from preparation example 2 is combined with the ingredients listed in table 1. The procedure for this is to introduce the binder dispersion to start with and to carry out dilution with deionized water. The inventive but not the conventional coating composition is additionally admixed with a 30% strength aqueous solution of a commercially customary vinylpyrrolidone-vinyl acetate copolymer (Collacral VAL, BASF). Subsequently the pigment paste is introduced with stirring. The figures reported correspond to weight fractions (g).

TABLE 1

| | Coating composition | |
|---|---|---|
| | conventional (I) | inventive (II) |
| DM water | 2448 | 2433 |
| Binder dispersion (preparation example 2) | 2332 | 2332 |
| Aqueous pigment paste (preparation example 4) | 270 | 270 |
| Vinylpyrrolidone-vinyl acetate copolymer solution (30% in water; Collacral VAL, BASF) | — | 15 |

The coating compositions are aged for 3 days at room temperature with stirring before being used for cathodic electrodeposition. The paint films are deposited under the parameters indicated in table 2 on cathodically connected, zinc-phosphatized steel test panels without a Cr(VI) afterrinse in the pretreatment.

TABLE 2

| | Dipping solution 1 | Dipping solution 2 |
|---|---|---|
| Coating composition | conventional (I) | inventive (II) |
| Solution temperature | 32° C. | 32° C. |
| pH | 5.71 | 5.78 |
| Voltage (V) | 320 | 320 |
| Conductivity (mS/cm) | 1.79 | 1.81 |
| Film thickness obtained (μm) | 20 | 21 |

The deposited paint films are afterrinsed with deionized water and baked at 175° C. (article temperature) for 15 minutes.

Test for Runs

The following procedure can be used to reconstruct the formation of run marks in the laboratory.

First of all the test specimens are produced. This is done by marking a square area (side length=panel width) at the top end of a large metal panel (phosphatized test panel measuring 10.5 cm×30 cm). Adhered subsequently to this area is a second, smaller metal test panel (phosphatized test panel measuring 10.5 cm×19 cm). A stencil is used to fix the envisaged bonding points (x) on the large test panel as shown in FIG. 1. To start with an instant-setting two-part adhesive (UHU plus sofort fest) is applied to each bond side (x), after which a steel ring (DIN/ISO 988, internal radius 6 mm, external radius 12 mm, height 0.1 mm) is placed onto the adhesive and the adhesive is spread a little. Then the second, smaller panel is adhered to the bond sites on the larger panel in such a way that the bottom edge of the smaller panel finishes flush with the bottom edge of the square section marked on the larger panel. This produces a cavity between the panels. During the bonding operation the panels are weighted with a 500 g weight.

Prior to coating, the test specimens thus prepared are immersed in fully demineralized water for 2 minutes to start with. The electrocoating solution is heated to the desired coating temperature (32° C.). A paint film is deposited as described above on each of the test specimens connected as cathodes. Thereafter the test specimens are rinsed off thoroughly with running demineralized water. The test specimens are flashed off for 5 minutes (23-25° C., without stream of air) and baked while hanging. A determination is made of the number, length, width, and plasticity of the runs emerging from the cavity. The results are given in table 3.

TABLE 3

|  | Dipping solution 1 | Dipping solution 2 |
| --- | --- | --- |
| Coating composition | conventional (I) | inventive (II) |
| Number of runs | 5 | 2 |
| Width of runs (mm) | 4 | 2 |
| Length of runs (cm) | 9 | 6 |
| Plasticity of runs | raised | flat |

The results show that the number, length, width, and plasticity of the runs emerging from the cavity are significantly reduced when using the coating composition of the invention in comparison to the use of a conventional coating composition.

What is claimed is:

1. An aqueous coating composition comprising
   (A) at least one water-dispersible organic binder comprising cationic groups and
   (B) 0.05%-10% by weight, based on the solids content of the aqueous coating composition, of a water-thinnable vinylpyrrolidone copolymer comprising vinylpyrrolidone monomer units and vinyl acetate monomer units in a molar ratio of 0.3:0.7 to 0.7:0.3 and a weight-average molecular weight of less than 200 000 g/mol.

2. The aqueous coating composition claim 1, which is a cathodically depositable electrodeposition primer.

3. The aqueous coating composition of claim 1, comprising 60%-95% by weight, based on the solids content of the aqueous coating composition, of at least one binder (A).

4. The aqueous coating composition of claim 1, wherein the binder (A) comprises one or more groups selected from the group consisting of primary amino groups, secondary amino groups, tertiary amino groups, quaternary amino groups, ammonium groups, and mixtures thereof.

5. The aqueous coating composition of claim 1, wherein the binder (A) is an amine-modified epoxy resin.

6. The aqueous coating composition of claim 1, wherein the at least one binder (A) is obtained from an aqueous binder dispersion by
   i) reacting 1) a precursor prepared with addition of at least one of phosphines, phosphine salts, and mixtures thereof as catalyst from a) a diepoxide compound or a mixture of diepoxide compounds and b) monophenol, diphenol or a mixture of monophenols and diphenols,
   2) with at least one organic amine or a mixture of organic amines at addition temperatures reduced to 60 to 130° C., to form an epoxide-amine adduct,
   ii) subsequently or simultaneously reacting the secondary hydroxyl groups formed in the reaction of components a) and b) with epoxide groups of the epoxide-amine adduct prepared in step i), at a temperature of 110 to 150° C.,
   iii) adding a crosslinking agent or a mixture of different crosslinking agents at a temperature of <150° C.,
   iv) carrying out neutralization, and
   v) dispersing the mixture obtained in stages i) to iv) in water.

7. The aqueous coating composition of claim 1, comprising 0.1%-5% by weight, based on the solids content of the aqueous coating composition, of the vinylpyrrolidone copolymer (B).

8. The aqueous coating composition of claim 1, wherein the vinylpyrrolidone copolymer (B) comprises a weight-average molecular weight of 30 000-170 000 g/mol.

9. The aqueous coating composition of claim 1, wherein the vinylpyrrolidone copolymer (B) comprises vinylpyrrolidone monomer units and vinyl acetate monomer units in a molar ratio of 0.4:0.6 to 0.6:0.4.

10. The aqueous coating composition of claim 1, further comprising 18% to 28% by weight, based on the solids content of the aqueous coating composition, of at least one crosslinking agent comprising a blocked (poly)isocyanate.

11. The aqueous coating composition of claim 1, further comprising 5% to 40% by weight, based on the solids content of the aqueous coating composition, of at least one pigment.

12. A process for preparing the aqueous coating composition of claim 1, comprising
   i) dispersing at least one water-dispersible organic binder (A) containing cationic groups in an aqueous solution to give an aqueous binder dispersion,
   ii) mixing the aqueous binder dispersion with 0.05% to 10% by weight, based on the solids content of the aqueous coating composition, of a water-thinnable vinylpyrrolidone copolymer (B) comprising a weight-average molecular weight of less than 200 000 g/mol, and which is prepared from vinylpyrrolidone monomer units and vinyl acetate monomer units in a molar ratio of 0.3:0.7 to 0.7:0.3, and
   iii) optionally introducing further additives.

13. A method of coating an electrically conductive substrate, comprising coating a substrate with the aqueous coating composition of claim 1 by cathodic electrodeposition, wherein the substrate is selected from metallic substrates, phosphatized metallic substrates, and phosphatized steel.

14. The method of of claim 13, wherein the substrate comprises a motor vehicle body or a part thereof.

15. A coated metallic substrate, coated with the aqueous coating composition of claim 1.

16. The coated metallic substrate of claim 15 that is a motor vehicle body or a part thereof.

* * * * *